United States Patent
Zhang et al.

(10) Patent No.: US 9,550,229 B2
(45) Date of Patent: Jan. 24, 2017

(54) FLUORIDE-FREE CONTINUOUS CASTING MOLD FLUX FOR ULTRALOW-CARBON STEEL

(71) Applicant: Baoshan Iron & Steel Co., Ltd., Shanghai (CN)

(72) Inventors: Chen Zhang, Shanghai (CN); Dexiang Cai, Shanghai (CN); Feng Mei, Shanghai (CN); Jianguo Shen, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 0 days.

(21) Appl. No.: 14/807,254

(22) Filed: Jul. 23, 2015

(65) Prior Publication Data

US 2015/0328679 A1 Nov. 19, 2015

Related U.S. Application Data

(63) Continuation of application No. PCT/CN2013/086816, filed on Nov. 11, 2013.

(30) Foreign Application Priority Data

Jan. 25, 2013 (CN) .......................... 2013 1 0028888

(51) Int. Cl.
*B22C 1/02* (2006.01)
*C03C 14/00* (2006.01)
*B22D 11/111* (2006.01)

(52) U.S. Cl.
CPC ............... *B22C 1/02* (2013.01); *B22D 11/111* (2013.01); *C03C 14/00* (2013.01)

(58) Field of Classification Search
CPC ........... B22D 11/111; B22C 1/02; C03C 14/00
See application file for complete search history.

(56) References Cited

U.S. PATENT DOCUMENTS

| | | | | |
|---|---|---|---|---|
| 4,594,105 A * | 6/1986 | Grimm | ................. | B22D 11/111 75/305 |
| 6,174,347 B1 * | 1/2001 | Barker | ................. | B22D 11/111 75/560 |
| 6,179,895 B1 * | 1/2001 | Barker | ................. | B22D 11/111 75/303 |
| 6,461,402 B1 * | 10/2002 | Morita | ................. | B22D 11/111 148/540 |
| 2007/0009373 A1 * | 1/2007 | Omoto | ................. | B22D 11/111 419/34 |
| 2015/0101453 A1 | 4/2015 | Zhang et al. | | |

FOREIGN PATENT DOCUMENTS

| | | | |
|---|---|---|---|
| CN | 1481954 A | | 3/2004 |
| CN | 1666829 A | | 9/2005 |
| CN | 101406939 A | | 4/2009 |
| CN | 101472693 A | | 7/2009 |
| CN | 102059330 A | | 5/2011 |
| CN | 102151812 A | | 8/2011 |
| CN | 102794420 A | | 11/2012 |
| CN | 103317111 A | | 9/2013 |
| JP | 51-67227 A | * | 6/1976 |
| JP | 2000158107 A | | 6/2000 |
| JP | 2000169136 A | | 6/2000 |
| JP | 2001205402 A | | 7/2001 |
| JP | 2002096146 A | | 4/2002 |
| JP | 2007167867 A | | 7/2007 |
| JP | 2010-23043 A | * | 2/2010 |
| JP | 2012218042 A | | 11/2012 |

OTHER PUBLICATIONS

International Search Report mailed Feb. 27, 2014 in PCT/CN2013/086816, 3 pages.
He, Guo Ping, "The research of fluorine-free and low fluorine continuous casting mold flux," doctoral dissertation, published Dec. 15, 2010, pp. II, 24-27 and 38 (with English Abstract).

* cited by examiner

*Primary Examiner* — Anthony J Green
(74) *Attorney, Agent, or Firm* — Kilpatrick Townsend & Stockton LLP

(57) ABSTRACT

A fluoride-free continuous casting mold flux for ultralow carbon steel, comprising the following components in weight percentage: 3-10% of $Na_2O$, 0-3% of $Li_2O$, 3-8% of MgO, 5-15% of MnO, 0-8% of BaO, 4-12% of $Al_2O_3$, and impurities with a content of no more than 2%, the balance being CaO and $SiO_2$, wherein the ratio of $CaO/SiO_2$ is 0.8-1.3; the raw materials are mixed and then pre-melted; the pre-melted mold flux requires micro-adjusting according to the component deviation, and the ratio of the pre-melted material is not lower than 70%; then a carbonaceous material of 1-3% by the total weight of the mold flux is added and mixed so as to obtain the finished product mold flux. Said mold flux has a melting point of 1100-1200° C. and a viscosity of 0.2-0.6 Pa·s at 1300° C. A method for preparing a mold flux comprising the following steps: mixing raw materials, pre-melting to obtain a pre-melt; then continuously supplementing raw materials into the pre-melt to obtain a substrate with a desired composition; then adding a carbonaceous material to the substrate and mixing so as to obtain said mold flux. This mold flux is a boron-free and fluoride-free mold flux, can effectively reduce the inclusion defect of blank casting and increase the yield of blank casting.

6 Claims, No Drawings

FLUORIDE-FREE CONTINUOUS CASTING MOLD FLUX FOR ULTRALOW-CARBON STEEL

CROSS-REFERENCES TO RELATED APPLICATIONS

This application is a continuation application of PCT application PCT/CN2013/086816 entitled "FLUORIDE-FREE CONTINUOUS CASTING MOLD FLUX FOR ULTRALOW-CARBON STEEL," filed on Nov. 11, 2013, which claims priority to Chinese Patent Application No. 201310028888.5, filed on Jan. 25, 2013, which are herein incorporated by reference in their entirety for all purposes.

FIELD OF THE INVENTION

The invention relates to an auxiliary material for continuous casting in steel making, particularly to a continuous casting mold flux for ultralow-carbon steel.

BACKGROUND OF THE INVENTION

A continuous casting mold flux is a powdery or granular auxiliary material used in steel making for covering the molten steel surface in a crystallizer of a conticaster. Due to high temperature of the molten steel, the mold flux comprises a solid layer and a liquid layer, wherein the molten layer is immediately adjacent to the molten steel, and the part of the mold flux above the molten layer remains in its original granular or powder form so as to achieve good insulation and thus preventing the molten steel surface from solidifying. On the other hand, due to the periodic vibration of the crystallizer, the molten layer flows continuously into a crevice between a copper plate of the crystallizer and an initial shell of the molten steel to lubricate the relative movement between the shell and the copper plate, such that good surface quality of a cast slab is guaranteed. In addition, the molten layer also has the functions of absorbing nonmetal inclusions ascending in the molten steel and purifying the molten steel. Generally, the mold flux film flowing into the crevice between the copper plate of the crystallizer and the shell is only 1-2 mm. One side of the film that is adjacent to the copper plate is in solid phase, while the other side adjacent to the shell is still in liquid phase. The liquid phase has a function of lubrication. The solid phase has good control over the capability of the copper plate of the crystallizer in cooling the shell, such that the cooling rate of the molten steel may be regulated and the effect in controlling heat transfer can be achieved. Hence, a mold flux is the last process technique for controlling the surface quality of a cast slab in steel making A mold flux with inappropriate properties may induce surface deficiencies such as flux inclusions, cracks, etc. in the cast slab. More seriously, the shell may even break and an accident of steel leakage may be incurred. Therefore, a mold flux is an important means for guaranteeing successful proceeding of a continuous casting process and surface quality of a cast slab.

Generally, a casting mold flux comprises mainly a binary system of CaO and SiO2, accompanied with fusion aids such as CaF2, Na2O, Li2O and the like to lower melting point and viscosity of the binary system of CaO and SiO2, as well as a small amount of such components as Al2O3, MgO, MnO, Fe2O3 and the like to obtain desirable metallurgical properties. Since the melting point of a mold flux is about 400° C. lower than the temperature of molten steel, an amount of carbonaceous material must be added to allow slow melting of the mold flux having a relatively low melting point on the surface of molten steel. The carbonaceous material, having a very high melting point, can stop agglomeration of liquid drops of the mold flux effectively, and thus retard melting of the mold flux. Among these components of the mold flux, the ratio of CaO to SiO2 (i.e. CaO/SiO2, referred to as basicity hereafter) and the amount of F may be regulated to achieve an effective control over the precipitation rate of cuspidate (3CaO.2SiO2.CaF2), in order to fulfill the purpose of regulating the crystallization behavior of the mold flux reasonably. Crystallization behavior is the most effective means for the mold flux to control heat transferring properties. Stronger crystallization behavior results in higher thermal resistance of the mold flux and lower heat transfer intensity. Fully vitrified mold flux has the minimum thermal resistance and the maximum heat transfer intensity. For low-carbon steel, ultralow-carbon steel and those types of steel having poor thermal conductivity (e.g. silicon steel, etc.), in order to improve the cooling of casting slabs, crystallization of the mold flux is undesirable. Hence the amount of F is generally low, specifically at about 3-5%. However, for peritectic steel and those types of steel containing crack-sensitive elements, if the cooling of molten steel in a crystallizer is uneven or too fast, the initial shell will break readily at weak locations under various stresses, resulting in longitudinal cracks. For these types of steel, the mold flux must have a very high crystallization behavior to effect slow cooling and inhibition of cracking. In these circumstances, the content of F in the mold flux is usually up to 8-10%. It can be seen that F contained in a mold flux not only acts to lower melting point and viscosity, but also plays an important role in improving crystallization. Thus, it is a very important component in a mold flux.

It is well known that F is a toxic element whose harm to human beings, animals and plants is at a level 20 times higher than the harm level of sulfur dioxide. Due to the high working temperature of the mold flux, which is generally at about 1500° C., a large quantity of environmentally harmful fluoride gases (including SiF4, HF, NaF, AlF3, etc.) are produced in the melting process. Fluorides, especially HF, in the air, are among the common air pollutants. Additionally, after exiting the crystallizer, the molten mold flux at high temperature contacts secondary cooling water sprayed on a cast slab at high speed, and they interact with each other to undergo the following reaction:

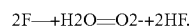

2F—+H2O=O2-+2HF.

When HF dissolves in water, the fluoride ion concentration in the secondary cooling water and pH of the secondary cooling water are increased. As the secondary cooling water is recycled, the fluoride ions will be further enriched, and pH will be further increased. The increase of the fluoride ion concentration and pH of the secondary cooling water speeds up the corrosion of the continuous casting equipment greatly, leading to higher maintenance fee of the equipment, higher difficulty and neutralizer cost in treatment of the recycling water, and higher burden of sewage discharge.

In view of the above problems concerning a F containing flux, both domestic and foreign metallurgists devote themselves actively to development of environmentally friendly mold fluxes that are free of F. Currently, a relatively feasible solution is replacement of F with B2O3 which is batched reasonably with such components as Na2O, Li2O and the like to fulfil the purpose of regulating the melting property of the mold flux. See, for example, CN201010110275.2, CN200510065382, CN201110037710.8, JP2001205402, etc. However, the melting point of B2O3 is only on the order of 450° C., far lower than those of the other components of the mold flux. Hence, the softening temperature of the solid phase of the boron-containing mold flux is apparently lower. Consequently, the proportion of the solid phase in the flux film located in the crevice between the copper plate of the crystallizer and the shell is rather low, resulting in lowered thermal resistance of the flux film and rather high heat flow in the crystallizer. In addition, B2O3 contained in the mold flux tends to form a network structure, which inhibits crystallization. As a result, the solid phase has a vitreous structure. A vitreous solid phase has lower thermal resistance than a crystalline solid phase. Therefore, a boron-containing flux has lower thermal resistance than a traditional fluoride-containing flux. Once the excessively high heat flow exceeds the limit designed for a caster, not only the service life of the crystallizer will be affected, but the risk of sticking breakout will be increased. For ultralow carbon steel, the principal quality problem of a cast slab is the deficiency of flux inclusions due to embedding of molten mold flux in molten steel. For minimizing the possibility of embedding of the molten flux, one of the most effective measures is to promote separation of the mold flux by increasing the surface tension of the flux. However, B2O3 is a component capable of decreasing the surface tension of the molten flux. Hence, with regard to mold flux used for ultralow carbon steel, B2O3 is a component that must be controlled. The mold fluxes designed in patent application CN200810233072.5 and patent CN03117824.3 have an unduly high crystallization behavior and are suitable for crack-sensitive steel such as peritectic steel, etc. Patent applications JP2000158107 and JP2000169136 have proposed mold fluxes having high melting points and high viscosity, which are mainly used for billet continuous casting. In patent application JP2002096146, the MgO content is too high, such that Mg—Al spinel having a melting point higher than 2000° C. tends to form and worsen lubrication badly after the molten flux absorbs a certain amount of Al2O3.

BRIEF SUMMARY OF THE INVENTION

The object of the invention is to provide a fluoride-free continuous casting mold flux for ultralow-carbon steel. The mold flux of the present application is free of boron and fluoride, is capable of reducing effectively the deficiency of flux inclusions in a cast slab so as to improve the product yield of the cast slab.

In order to achieve the above technical object, in a first aspect of the invention, the following technical solution is adopted according to the invention:

A fluoride-free continuous casting mold flux for ultralow-carbon steel, comprising by weight: $Na_2O$ 3-10%, $Li_2O$ 0-3%, MgO 3-8%, MnO 5-15%, BaO 0-8%, $Al_2O_3$ 4-12%, less than 2% of impurities, and the balance of CaO and $SiO_2$, wherein the weight ratio of $CaO/SiO_2$ is 0.8-1.3.

Preferably, the fluoride-free continuous casting mold flux for ultralow-carbon steel comprises by weight: $Na_2O$ 5-9%, $Li_2O$ 1-3%, MgO 3-6%, MnO 5-10%, BaO 0-6%, $Al_2O_3$ 6-11%, less than 2% of impurities, and the balance of CaO and $SiO_2$, wherein the weight ratio of $CaO/SiO_2$ is 0.9-1.3.

The above raw materials are mixed and subjected to a pre-melting treatment. After the pre-melting, the composition of the pre-melted mold flux is trimmed according to the compositional deviation, wherein the proportion of the pre-melted substance is not less than 70%. Then, a carbonaceous material is added to afford 1-3% of C based on the total weight of the mold flux. After mixing, a final flux product is obtained. During the above pre-melting treatment, when various raw materials are melted, sublimation, evaporation, etc., lead to various degrees of loss. Consequently, a deviation of the actual composition and total weight of the material resulting from the pre-melting treatment (referred to as pre-melted substance in the invention) relative to the target composition and weight of the desired mold flux (i.e. the total weight of the various raw materials initially added stoichiometrically to the pre-melting process) exists due to the above loss. Thus, subsequent supplementary addition of the corresponding raw materials is entailed in light of the actual composition and weight of the pre-melted substance, so as to obtain the inventive fluoride-free continuous casting mold flux for ultralow-carbon steel, and the mold flux has the target composition and weight. As described herein, the expression of "the proportion of the pre-melted substance is not less than 70%" means that the total weight of the pre-melted substance is not less than 70% of the target weight. In other words, the total weight of the various raw materials lost during the pre-melting treatment is less than 30% of the target weight.

The mold flux has a melting point of 1100-1200° C. and a viscosity at 1300° C. of 0.2-0.6 Pa·s.

Preferably, the melting point of the mold flux is 1100-1170° C., and its viscosity at 1300° C. is 0.2-0.5 Pa·s.

In a second aspect of the invention, there is provided a fluoride-free continuous casting mold flux product for ultralow-carbon steel, which is formed by mixing a matrix and 1-3% of a carbonaceous material based on the total weight of the matrix.

The matrix comprises the following components by weight: $Na_2O$ 3-10%, $Li_2O$ 0-3%, MgO 3-8%, MnO 5-15%, BaO 0-8%, $Al_2O_3$ 4-12%, not higher than 2% of impurities, and the balance of CaO and $SiO_2$, wherein the weight ratio of $CaO/SiO_2$ is 0.8-1.3.

Preferably, the matrix comprises the following components by weight: $Na_2O$ 5-9%, $Li_2O$ 1-3%, MgO 3-6%, MnO 5-10%, BaO 0-6%, $Al_2O_3$ 6-11%, not more than 2% of impurities, and the balance of CaO and $SiO_2$, wherein $CaO/SiO_2$ is 0.9-1.3.

The matrix meets the following condition: the proportion of pre-melted substance is not less than 70%.

In a preferred embodiment of the invention, the melting point of the matrix is 1100-1200° C., and its viscosity at 1300° C. is 0.2-0.6 Pa·s.

In a third aspect of the invention, there is provided a fluoride-free continuous casting mold flux product for ultralow-carbon steel, which consisting of a matrix and 1-3% of a carbonaceous material based on the total weight of the matrix.

The matrix comprises the following components by weight: $Na_2O$ 3-10%, $Li_2O$ 0-3%, MgO 3-8%, MnO 5-15%, BaO 0-8%, $Al_2O_3$ 4-12%, not more than 2% of impurities, and the balance of CaO and $SiO_2$, wherein the weight ratio of $CaO/SiO_2$ is 0.8-1.3.

Preferably, the matrix comprises the following components by weight: $Na_2O$ 5-9%, $Li_2O$ 1-3%, MgO 3-6%, MnO 5-10%, BaO 0-6%, $Al_2O_3$ 6-11%, not more than 2% of impurities, and the balance of CaO and $SiO_2$, wherein $CaO/SiO_2$ is 0.9-1.3.

In a preferred embodiment of the invention, the melting point of the matrix is 1100-1200° C., and its viscosity at 1300° C. is 0.2-0.6 Pa·s.

In a fourth aspect of the invention, there is provided a method of preparing the fluoride-free continuous casting mold flux product for ultralow-carbon steel according to the invention, comprising: mixing and pre-melting all raw materials used for a matrix based on a final and desired composition of the matrix to obtain a pre-melted substance; supplementing raw materials to the pre-melted substance to obtain a matrix having the desired composition; adding a carbonaceous material to the matrix and mixing the contents; spray drying to obtain the fluoride-free continuous casting mold flux product for ultralow-carbon steel.

During the above pre-melting treatment, when various raw materials are melted, sublimation, evaporation, etc., lead to various degrees of loss. Consequently, a deviation of the actual composition and total weight of the material resulting from the pre-melting treatment (referred to as pre-melted substance or pre-melted part in the invention) relative to the target composition and weight of the desired matrix (i.e. the total weight of the various raw materials initially added stoichiometrically to the pre-melting process) exists due to the above losses. Thus, subsequent supplementary addition of the corresponding raw materials is entailed in light of the actual composition and weight of the pre-melted substance, so as to obtain the inventive matrix having the target composition and weight. As described herein, "the proportion of the pre-melted part is not less than 70%" means that the total weight of the pre-melted part (pre-melted substance) is not less than 70% of the target weight. In other words, the total weight of the various raw materials lost in the pre-melting treatment is less than 30% of the target weight.

In the invention, all percentages are percentages by weight, and all ratios are ratios by weight, unless otherwise specified. The terms "fluoride-free continuous casting mold flux" and "matrix" can be used exchangeably, and refer to a material mixture having a desired composition and obtained after all raw materials except a carbonaceous material are mixed in proportion, pre-melted and supplemented with additional raw materials. The terms "final mold flux" and "fluoride-free continuous casting mold flux product" can be used exchangeably, and refer to a mixture product which is obtained by adding a carbonaceous component into the above "fluoride-free continuous casting mold flux" or "matrix", mixing and optionally spray drying, and can be used finally.

In a preferred embodiment of the invention, the fluoride-free continuous casting mold flux or matrix of the invention has the following composition: $Na_2O$ 3-10%, $Li_2O$ 0-3%, MgO 3-8%, MnO 5-15%, BaO 0-8%, $Al_2O_3$ 4-12%, not more than 2% of impurities, and the balance of CaO and $SiO_2$, wherein the weight ratio of $CaO/SiO_2$ is 0.8-1.3. The contents of each of the above stated components are all based on the total weight of the fluoride-free continuous casting mold flux or matrix, and the sum of the contents of the various components is 100%. The 1-3% of carbonaceous material is a component added additionally.

The invention relates to a fluoride-free, environment-friendly continuous casting mold flux for low-carbon steel. The flux of the present application has a composition based on a $CaO—SiO_2$ binary system accompanied with an amount of $Na_2O$, $Li_2O$ as fusion aids and other components such as MgO, MnO, BaO, $Al_2O_3$, etc. In order to guarantee rapid and even melting of the mold flux, after mixing at a target composition, relevant raw materials of the mold flux are subjected to pre-melting treatment in advance. As such, a complicated solid solution is formed from these substances, so that the melting points of these substances tend to be close to each other. Thus, the melting temperature region of the mold flux, i.e. the difference between the temperature at which the melting ends and the temperature at which the melting starts, can be controlled within a narrow range. The pre-melted mold flux needs trimming in accordance with compositional deviation, but the proportion of the pre-melted substance should not be less than 70%. At the same time, a suitable amount of a carbonaceous material such as carbon black, graphite and the like is added. The pre-melting operation and the subsequent compositional supplement/trimming operations are all operating processes known in the art, and may be conducted in any suitable manner known in the art, provided that the desired final target composition can be obtained, and the proportion of the pre-melted substance is not less than 70%.

The basicity as required by the mold flux of the present invention, i.e. $CaO/SiO_2$, is controlled in the range of 0.8-1.3, such that a certain crystallization amount can be ensured. If the basicity is less than 0.8, crystallization of the mold flux will become difficult; if it exceeds 1.3, the melting point of the mold flux will be too high, which is undesirable for the lubrication effect of the mold flux between the copper plate of the crystallizer and the shell.

$Na_2O$ is the most common fusion aid in a mold flux. It can lower the melting point and viscosity of the mold flux effectively and has a typical content of 3% or higher. Additionally, the presence of $Na_2O$ can boost precipitation of crystals such as sodium xonotlite ($Na_2O.CaO.SiO_2$), nepheline ($Na_2O.Al_2O_3.2SiO_2$), etc. If its content is higher than 10%, the crystallization amount will be too high, such that the melting point and the viscosity tend to rise instead, which is undesirable for the lubrication effect of the liquid flux on the cast slab. In addition, excessive crystallization renders the thermal resistance of the flux film unduly high, such that the shell of the molten steel grows too slowly, which is unfavorable for increase of the draw speed of the caster and thus affects the output of a steel plant.

$Li_2O$ can lower the melting point and viscosity of a mold flux apparently. However, its price is very high and is more than 20 times higher than that of fluorite (the form in which F is added into a flux). Hence, excessive addition may increase the raw material cost of the mold flux remarkably, which is undesirable for industrial application of a fluoride-free mold flux. Therefore, $Li_2O$ is usually used as an auxiliary fusion aid, and added appropriately when the melting point and the viscosity are undesirably high. Considered from a perspective of cost, the amount of $Li_2O$ should not exceed 3%.

Addition of a suitable amount of MgO into a mold flux may lower the viscosity of the molten flux, and thus makes up the function of F in lowering the viscosity in the case of a fluoride-free flux. Along with the increase of the MgO content, the crystallization propensity of the molten flux also increases gradually, wherein merwinite (($3CaO.MgO.2SiO_2$), bredigite ($7CaO.MgO.4SiO_2$) and akermanite ($2CaO.MgO.2SiO_2$) are the most common crystalline forms. If its content is higher than 8%, the crystallization behavior will become too strong, which is also unfavorable for continuous casting production of low-carbon steel.

The presence of MnO can also lower melting point and viscosity to certain extent. In addition, Mn is a black metal, and its oxides may darken the transparency of glass, such that the rate of heat diffusion by radiation of molten steel is decreased significantly. This also achieves the effect of increasing the thermal resistance of the mold flux film. As an oxide of a transition element, MnO substitutes MgO in the crystalline structure or coexists with MgO to form a composite crystal. Hence, its amount should not be too high either. As MnO and $SiO_2$ are both components having high oxygen potential in the mold flux, they may undergo redox reactions with Al in ultralow carbon steel during use, such that their actual contents in the mold flux will be decreased. Hence, it is desirable to control the amount of Mn not higher than 15%.

Both BaO and CaO are alkaline earth metal oxides. Addition of BaO may also increase the basicity of the mold flux. Moreover, the effect of BaO on crystallization behavior is weaker than that of CaO, and appropriate addition may also decrease the melting point and viscosity. Hence, BaO is a common component in a multi-component mold flux. Due to its relatively high density, excessive addition has a risk of resulting in inhomogeneous melting. Therefore, its content is desirably not higher than 8%.

$Al_2O_3$ is a component for forming a network structure in the mold flux. Its existence may increase the viscosity of the mold flux and decrease the crystallization amount. Hence, it is a main factor for regulating these two properties of the flux. If its content is less than 4%, the crystallization amount cannot be controlled. If its content exceeds 12%, the influence on the viscosity will be too large. Therefore, a content within this range is desirable.

Since the melting point of a mold flux is about 400° C. lower than that of molten steel, carbonaceous material is necessary to control steady melting of the mold flux on the surface of the molten steel and maintain a certain thickness of a powder flux layer (which has an effect of insulation). Carbon is a substance having a high melting point, and can prevent agglomeration of liquid drops of a melted flux. In addition, carbon becomes gas after burning, and thus will not pollute the mold flux. In the case of a mold flux for continuous casting of low-carbon steel slabs, it is appropriate to add 1-3% of a carbonaceous material.

The physical properties of the fluoride-free mold flux for ultralow-carbon steel according to the invention also reside in a melting point in the range of 1100-1200° C., and a viscosity at 1300° C. in the range of 0.2-0.6 Pa·s. In the course of use, it can fully satisfy the requirements of continuous casting production of ultralow-carbon steel, and achieve an effect of use equal to or even better than that of a traditional F-containing flux.

Since this mold flux does not contain fluorine which is harmful to human body and environment, it is an environmental friendly product. As verified by use on the spot of production, the use of the fluoride-free mold flux not only eliminates harm to human bodies and pollution to the air, but also avoids decreasing in the pH of secondary cooling water, thereby alleviating equipment corrosion greatly. Furthermore, enrichment of fluorides in the secondary cooling water will not occur any more. Consequently, the burden of treating and discharging recycling water is relieved remarkably. In respect of the quality of ultralow carbon steel slabs, when the mold flux designed according to the invention is used, the incidence of flux inclusion at the surface is even lower than the case in which a traditional F-containing flux is used.

The boron-free, fluoride-free mold flux provided by the invention can reduce effectively the deficiency of flux inclusions in a cast slab caused by the mold flux, and thus increase the product yield of the cast slab. The mold flux has already been used successfully in a conticaster for ultralow-carbon steel slabs.

DETAILED DESCRIPTION OF THE INVENTION

The invention will be further illustrated with reference to the accompanying drawings and the following specific examples.

Examples

Raw materials for a mold flux (without limitation): limestone, quartz, glass, cement clinker, wollastonite, bauxite, magnesite clinker, soda, barium carbonate, pigment manganese, manganese carbonate, lithium carbonate, lithium concentrate, etc.

The above raw materials were ground into fine powder, mixed homogeneously according to the matrix composition of the mold flux (i.e. the target composition), and then pre-melted to form a complicated solid solution from these substances and simultaneously release carbonates and volatiles such as water, etc. A pre-melted substance having faster melting speed and better homogeneity was obtained, followed by cooling, pulverizing and secondary grinding into fine powder having a particle size of less than 0.075 mm. Because of the various degrees of loss of the various raw materials during the pre-melting treatment, there was a deviation between the composition and total weight of the fine powder pre-melted substance obtained in the above steps and the target composition and weight. On the ground of the specific deviation, trimming was conducted by supplementing the above raw materials, so as to obtain a matrix having the target composition and the target weight. The pre-melted substance accounted for not less than 70% of the target weight. Subsequently, a suitable amount of a carbonaceous material such as carbon black, graphite and the like was added as desired, mixed mechanically, or treated using a spray drying device to produce a final granular mold flux. The compositions and properties of the final mold fluxes according to the Comparative Examples and Inventive Examples are listed in the table below.

|  |  | Comparative Examples | | Examples | | | | | |
| --- | --- | --- | --- | --- | --- | --- | --- | --- | --- |
|  |  | ① | ② | ① | ② | ③ | ④ | ⑤ | ⑥ |
| Chemical | CaO | 39 | 40 | 24.5 | 32.5 | 28.5 | 35.5 | 34 | 36 |
| Composition % | $SiO_2$ | 37 | 31 | 30.5 | 36.5 | 28.5 | 32.5 | 28.5 | 28 |
|  | $Al_2O_3$ | 3.5 | 5.5 | 4 | 8 | 9 | 6 | 11 | 12 |
|  | MgO | 13 | 3.5 | 7.5 | 4 | 7 | 6 | 5 | 3 |
|  | MnO | 1 | — | 14 | 7 | 9 | 5 | 10 | 12 |
|  | BaO | — | — | 8 | 4 | 7 | 6 | 4 | — |
|  | $Na_2O$ | 1 | 8.5 | 9.5 | 6 | 8 | 7 | 4 | 5 |
|  | $B_2O_3$ | — | 10 | — | — | — | — | — | — |
|  | $Li_2O$ | — | — | — | 0.3 | 1 | 1.5 | 2 | 2.8 |
|  | F | 4 | — | — | — | — | — | — | — |
| $CaO/SiO_2$ |  | 1.05 | 1.3 | 0.8 | 0.9 | 1.0 | 1.1 | 1.2 | 1.29 |

-continued

|  | Comparative Examples | | Examples | | | | | |
| --- | --- | --- | --- | --- | --- | --- | --- | --- |
|  | ① | ② | ① | ② | ③ | ④ | ⑤ | ⑥ |
| C | 2 | 1.7 | 2.9 | 1.2 | 1.8 | 2.2 | 2.5 | 2 |
| Melting point °C. | 1229 | 1128 | 1105 | 1150 | 1125 | 1140 | 1160 | 1190 |
| Viscosity at 1300° C. Pa · s | 0.29 | 0.34 | 0.45 | 0.6 | 0.4 | 0.32 | 0.27 | 0.22 |

What is claimed is:

1. A fluoride-free continuous casting mold flux for ultralow-carbon steel, comprising the following composition as calculated by weight: $Na_2O$ 3-10%, $Li_2O$ 0-3%, MgO 3-8%, MnO 5-15%, BaO 0-8%, $Al_2O_3$ 4-12%, not more than 2% of impurities, and the balance of CaO and $SiO_2$, wherein the ratio of $CaO/SiO_2$ is 0.8-1.3, wherein the mold flux is prepared by the following steps: mixing raw materials $Na_2O$, $Li_2O$, MgO, MnO, BaO, $Al_2O_3$, CaO and $SiO_2$, conducting a pre-melting treatment to produce a pre-melted substance; and subsequently adding supplementary said raw materials to trim its composition, wherein the pre-melted substance is not less than 70% of a target weight; then, a carbonaceous material is added to afford 1-3% of C based on the total weight of the mold flux; after mixing, a final mold flux is obtained; and wherein the continuous casting mold flux does not contain $B_2O_3$.

2. The fluoride-free continuous casting mold flux for ultralow-carbon steel according to claim 1, wherein the mold flux has a melting point of 1100-1200° C. and a viscosity at 1300° C. of 0.2-0.6 Pa·s.

3. A fluoride-free continuous casting mold flux product for ultralow-carbon steel, formed by mixing a matrix and 1-3% of a carbonaceous material based on the total weight of the matrix, wherein the matrix comprises the following composition as calculated by weight: $Na_2O$ 3-10%, $Li_2O$ 0-3%, MgO 3-8%, MnO 5-15%, BaO 0-8%, $Al_2O_3$ 4-12%, not more than 2% of impurities, and the balance of CaO and $SiO_2$, wherein the weight ratio of $CaO/SiO_2$ is 0.8-1.3;

the mold flux product is prepared by the following steps:
mixing raw materials comprising $Na_2O$, $Li_2O$, MgO, MnO, BaO, $Al_2O_3$, CaO and $SiO_2$, conducting a pre-melting treatment to produce a pre-melted substance; and subsequently adding supplementary said raw materials to trim its composition;

wherein the matrix meets the following condition: the pre-melted substance is not less than 70% of a target weight and wherein the continuous casting mold flux does not contain $B_2O_3$.

4. The fluoride-free continuous casting mold flux product for ultralow-carbon steel according to claim 3, wherein the matrix has a melting point of 1100-1200° C. and a viscosity at 1300° C. of 0.2-0.6 Pa·s.

5. A fluoride-free continuous casting mold flux product for ultralow-carbon steel, consisting of a matrix and 1-3% of a carbonaceous material based on the total weight of the matrix, wherein the matrix comprises by weight: $Na_2O$ 3-10%, $Li_2O$ 0-3%, MgO 3-8%, MnO 5-15%, BaO 0-8%, $Al_2O_3$ 4-12%, not more than 2% of impurities, and the balance of CaO and $SiO_2$, wherein the weight ratio of $CaO/SiO_2$ is 0.8-1.3; and wherein the continuous casting mold flux does not contain $B_2O_3$.

6. The fluoride-free continuous casting mold flux product for ultralow-carbon steel according to claim 5, wherein the matrix has a melting point of 1100-1200° C. and a viscosity at 1300° C. of 0.2-0.6 Pa·s.

* * * * *